(12) United States Patent
Shimoda

(10) Patent No.: US 12,440,314 B2
(45) Date of Patent: Oct. 14, 2025

(54) ORTHODONTIC BRACKET AND METHOD OF PREPARING ORTHODONTIC BRACKET

(71) Applicant: Shimoda Orthodontic Clinic, Fukuoka (JP)

(72) Inventor: Tetsuya Shimoda, Fukuoka (JP)

(73) Assignee: SHIMODA ORTHODONTIC CLINIC, Fukuoka (JP)

( * ) Notice: Subject to any disclaimer, the term of this patent is extended or adjusted under 35 U.S.C. 154(b) by 245 days.

(21) Appl. No.: 18/273,152

(22) PCT Filed: Nov. 12, 2021

(86) PCT No.: PCT/JP2021/041761
§ 371 (c)(1),
(2) Date: Jul. 19, 2023

(87) PCT Pub. No.: WO2022/168394
PCT Pub. Date: Aug. 11, 2022

(65) Prior Publication Data
US 2024/0115355 A1  Apr. 11, 2024

(30) Foreign Application Priority Data
Feb. 5, 2021 (JP) .................................. 2021-017806

(51) Int. Cl.
*A61C 7/16* (2006.01)
*A61C 7/14* (2006.01)
*A61C 7/20* (2006.01)

(52) U.S. Cl.
CPC ................. *A61C 7/16* (2013.01); *A61C 7/146* (2013.01); *A61C 7/20* (2013.01)

(58) Field of Classification Search
CPC .. A61C 7/16; A61C 7/146; A61C 7/20; A61C 7/12; A61C 7/14
See application file for complete search history.

(56) References Cited

U.S. PATENT DOCUMENTS 6,450,807 B1   9/2002  Chishti et al.
8,251,699 B2 *  8/2012  Reising .................... A61C 7/02
                                                     433/24

(Continued)

FOREIGN PATENT DOCUMENTS

JP   2002-526155 A   8/2002
JP   2012-066016 A   4/2012

(Continued)

OTHER PUBLICATIONS

International Search Report for International Application No. PCT/JP2021/041761 dated Dec. 7, 2021, with English translation.

(Continued)

*Primary Examiner* — Ralph A Lewis
(74) *Attorney, Agent, or Firm* — LUCAS & MERCANTI, LLP

(57) ABSTRACT

A method of preparing an orthodontic bracket is used in orthodontics, and an orthodontic method is performed using the orthodontic bracket. The orthodontic bracket is formed of a correction wire through pipe and an orthodontic bracket body. The correction wire through pipe is placed on a central recessed portion of a molar occlusal surface of a treatment subject. The orthodontic bracket is formed by thickly depositing a dental resin from above the correction wire through pipe and by curing the dental resin, and by forming a though hole through which a correction wire passes by cutting front and rear end portions of the orthodontic bracket thus exposing opening portions at both ends of the correction wire through pipe. A period until the correction is performed can be shortened so that the present invention compensates for defects that occurs in the orthodontics using a mouthpiece.

1 Claim, 7 Drawing Sheets

(56) References Cited

U.S. PATENT DOCUMENTS

| | | | |
|---|---|---|---|
| 9,615,898 B2* | 4/2017 | Ariza | A61C 7/141 |
| 10,342,640 B2* | 7/2019 | Cassalia | A61C 7/146 |
| 2004/0157184 A1* | 8/2004 | Reising | A61C 7/145 |
| | | | 433/8 |
| 2008/0057460 A1* | 3/2008 | Hicks | A61C 7/145 |
| | | | 433/20 |
| 2010/0239992 A1 | 9/2010 | Brandt et al. | |
| 2010/0279245 A1 | 11/2010 | Navarro | |
| 2015/0111166 A1 | 4/2015 | Ariza | |
| 2015/0125803 A1* | 5/2015 | Ariza | A61C 7/282 |
| | | | 433/17 |
| 2018/0214252 A1 | 8/2018 | Chun | |
| 2021/0196432 A1* | 7/2021 | Yousefian | A61C 7/10 |
| 2023/0240806 A1* | 8/2023 | Shimoda | A61C 7/002 |
| | | | 433/6 |
| 2024/0115355 A1* | 4/2024 | Shimoda | A61C 7/16 |

FOREIGN PATENT DOCUMENTS

| | | |
|---|---|---|
| JP | 2014-054418 A | 3/2014 |
| WO | 2019/217991 A1 | 11/2019 |

OTHER PUBLICATIONS

Office Action issued for the corresponding Japanese patent application No. 2021-017806, mailed on Nov. 19, 2024, with English translation, 4 pages.

Office Action, mailed Apr. 1, 2025, which was issued for the corresponding Japanese Patent Application No. 2021-017806, 6 pages, with English translation.

\* cited by examiner (a)

(b)

(a)

(b)

ORTHODONTIC BRACKET AND METHOD OF PREPARING ORTHODONTIC BRACKET

CROSS REFERENCE TO RELATED APPLICATION

This Application is a 371 of PCT/JP2021/041761 filed on Nov. 12, 2021, which, in turn, claims priority of Japanese Patent Application No. 2021-017806 filed on Feb. 5, 2021, and the above applications are incorporated herein by reference.

BACKGROUND OF THE INVENTION

Field of the Invention

The present invention relates to a method of preparing an orthodontic bracket used in orthodontics, and an orthodontic method performed using the orthodontic bracket.

Description of the Related Art

Conventionally, in the orthodontics, there have been known a wire orthodontic method and a mouthpiece orthodontic method. In the wire orthodontic method, the correction of dentition is performed by using: a jig that is called as a bracket and is made to adhere to a tooth surface of a treatment subject; and a correction wire that is made to pass through a through hole, a groove or the like formed in the bracket. In the mouthpiece correction method, the correction of the dentition is performed such that the movement of the teeth from the dentition before orthodontics to the desired ideal dentition is finely divided into several stages, a plurality of mouthpieces are formed in accordance with such stages, and the entire dentition was covered by the mouthpiece while sequentially exchanging the plurality of mouthpieces.

In the above-mentioned wire orthodontic method, a bracket smaller than teeth in size is made to adhere to teeth surfaces (a tongue side or a cheek side) of a treatment subject using a dental adhesive agent, and a correction wire is made to pass through a through hole, a groove or the like formed in the bracket.

In this case, the correction wire to be used is an elastic member, and is formed in an arcuate shape so as to follow the desired ideal dentition in advance.

Accordingly, at the time of making the correction wire pass through the though holes or the grooves, depending on the directions or the angles of the through holes, the grooves or the like formed in the bracket that adheres to the teeth surfaces of the treatment subject, the correction wire cannot keep the original arcuate shape. As a result, a restoring force that intends to return the correction wire into an original arcuate shape acts on the correction wire.

This restoring force is transmitted to the teeth of the treatment subject by way of the bracket, and moves the teeth so that orthodontics is performed where the treatment subject acquires the desired ideal dentition.

However, the bracket used in general is a ready-made product and hence, the teeth surface adhering surface of the bracket does not have a shape that conforms to teeth surfaces of each individual treatment subject. Accordingly, a fine delicate operation becomes necessary to perform the adhesion and hence, orthodontics requires a high technique.

In view of such circumstances, in the patent application that we filed previously (see patent literature 1), we prepared a bracket that engages with a concavo-convex shape of teeth surfaces of each individual treatment subject using a dental resin thus solving the above-mentioned problem.

Further, with respect to mouthpiece orthodontics, there has been disclosed a technique where a correction mouthpiece is prepared based on the actual dentition data of a treatment subject (see patent literature 2).

With the use of such a technique, the dentition of a treatment subject before performing orthodontics is scanned, and a process to an ideal dentition is obtained by performing simulation based on the scanned data thus realizing the preparation of the correction mouthpiece that conforms to each individual treatment subject.

Further, the shape of the correction equipment has a mouthpiece shape and hence, it is unnecessary to perform orthodontics that relies on a high technique with respect to the treatment as in the case of the conventional wire orthodontics.

PTL1: JP2012-66016
PTL2: JP2002-526155

SUMMARY OF INVENTION

Technical Problem

The techniques described above in patent literature 1 and patent literature 2 facilitates the treatment that requires mounting of an orthodontic equipment.

Further, in the wire orthodontic method described in patent literature 1, there is no strict limitation on the bracket adhering position and hence, it is possible to acquire a favorable advantageous effect that positioning of the bracket can be performed by taking into account not only the shape of teeth of the treatment subject but also a habit of the treatment subject at the time of biting.

Further, the mouthpiece orthodontic method described in patent literature 2 acquires a favorable advantageous effect that an aesthetic appearance that cannot be acquired by the wire orthodontics can be ensured.

However, both orthodontic methods have a problem that a long preparation period is necessary before the correction equipment is mounted on a treatment subject.

To be more specific, in the wire orthodontic method that uses the bracket described in patent literature 1, a mold of the dentition of the treatment subject before correction is sampled using an impression material, and a dentition model before performing orthodontics is prepared from the sampled mold.

Next, the dentition model before performing orthodontics is separated by cutting into respective teeth, and the respective teeth are arranged into a desired ideal dentition thus preparing an ideal dentition model.

Then, the mounting position of the bracket is decided using the ideal dentition model, the bracket is prepared by using a dental resin, and the completed bracket is made to adhere to actual teeth surfaces of the treatment subject thus finally providing the orthodontic device.

In the orthodontic method by the mouthpiece described in patent literature 2, firstly, the inside of an oral cavity of the treatment subject is scanned, and a scanned image is fetched to a computer as a 3D data.

Next, the fetched 3D data is separated by cutting in the computer on the basis of one tooth by one tooth, and the fetched dentition as the 3D data is arranged to the desired ideal dentition.

Then, the movement of the teeth for shifting the original dentition to the ideal dentition is performed in a plurality of stages in a divided manner, and the mouthpiece for orthodontics is prepared based on data obtained in the respective stages, and the mouthpiece for orthodontics is finally mounted.

This preparation period is substantially equal to the preparation period required by the conventional wire orthodontic method and hence, a mold must be actually prepared by molding using an impression or by scanning the inside of the oral cavity.

However, difficulties in performing orthodontics differ depending on the treatment subjects, and there may be a case where the orthodontics care requires a long period or a case where the orthodontics care is completed within a relatively short period.

Even in the case where the orthodontics care is completed within a relatively short period, the orthodontics care requires the long-period preparation. Accordingly, various problems are imposed on the treatment subject such as a problem relating to a large treatment cost or a problem that a period during which a treatment subject feels inconvenience such as malocclusion is prolonged.

Further, the orthodontics method using a mouthpiece described in patent literature 2 is a method that gradually moves and corrects teeth to be corrected in a correcting direction by pressing the teeth to be corrected by a mouthpiece that covers the dentition. Accordingly, in the orthodontics that includes the extrusion and the intrusion that are necessary for transmitting a force in the vertical direction so as to level the heights of upper surfaces of teeth, the uplifting that is necessary for transmitting a force in an oblique upward direction so as to raise a tooth in an inclined or fallen state, or the rotation that are necessary for transmitting a force in rotational direction to the teeth for changing teeth surface directions of the teeth, there may be a case where it is difficult or impossible to transmit a force necessary for the correction.

In the above-mentioned case, it is necessary to perform the wire orthodontics or a surgical operation again after performing the mouthpiece orthodontics. In this case, the dentition model becomes necessary again and hence, a period until the completion of the treatment is further prolonged.

With respect to the total dentition, an occlusal surface exists in a molar, and the occlusal surface includes a concavo-convex shape.

In such a concavo-convex shape, a central portion of the molar forms a recessed portion, and the closer the dentition is formed in an ideal dentition state, the more beautiful arcuate dentition is acquired when the recessed portions are connected to each other in line.

The present invention has been made in view of such circumstances, and it is an object of the present invention to provide a method of preparing an orthodontic bracket, wherein the orthodontic bracket that performs orthodontics is formed of a correction wire through pipe and an orthodontic bracket body, the correction wire through pipe is placed on a central recessed portion of a molar occlusal surface of a treatment subject, the orthodontic bracket body is formed by thickly depositing a dental resin from above the correction wire through pipe and by curing the dental resin, and a though hole through which a correction wire passes is formed by cutting front and rear end portions of the orthodontic bracket body thus exposing opening portions at both ends of the correction wire through pipe. Accordingly, the treatment subject can quickly receive the treatment without requiring a long preparation period. It is also an object of the present invention to provide an orthodontic method performed using the orthodontic bracket.

Solution to Problem

To overcome the above-mentioned problems, the present invention provides a method of preparing an orthodontic bracket and a method of performing orthodontics using the orthodontic bracket, wherein the orthodontic bracket that performs orthodontics is formed of a correction wire through pipe and an orthodontic bracket body, the correction wire through pipe is placed on a central recessed portion of a molar occlusal surface of a treatment subject, the orthodontic bracket body is formed by thickly depositing a dental resin from above the correction wire through pipe and by curing the dental resin, and a though hole through which a correction wire passes is formed by cutting front and rear end portions of the orthodontic bracket body thus exposing opening portions at both ends of the correction wire through pipe.

Advantageous Effects of Invention

According to the orthodontic bracket according to the present invention, the orthodontic bracket is formed of the correction wire through pipe and the orthodontic bracket body, the correction wire through pipe is placed on the central recessed portion of the molar occlusal surface of the treatment subject, the orthodontic bracket body is formed by thickly depositing a dental resin from above the correction wire through pipe and by curing the dental resin. Accordingly, the orthodontic bracket can be directly formed on the molar occlusal surface of the treatment subject and hence, the orthodontics can be performed within a shortest period without requiring the preparation that takes a long period such as the preparation of a mold, the designing of a mouthpiece or the like.

Further, the correction wire through pipe is placed on the central recessed portion of the molar occlusal surface of the treatment subject, and the orthodontic bracket body is formed by thickly depositing a dental resin from above the correction wire through pipe and by curing the dental resin. Accordingly, the partial orthodontics of the molar can be readily started and hence, a period until the completion of the orthodontics can be largely shortened compared to the conventional orthodontics method.

Further, with respect to the movement of teeth accompanied with the extrusion and the intrusion, the uplifting and the rotation of the molar, in the conventional mouthpiece orthodontics, before the mouthpiece orthodontics or after the mouthpiece orthodontics, it is necessary to perform the wire orthodontics that requires a preparation period again. Accordingly, a period until the completion of orthodontics is further prolonged. However, according to the orthodontic bracket of the present invention, even when the wire orthodontics is used in parallel so as to compensate for defects of the mouthpiece orthodontics, the correction treatment can be completed within a short period compared to the conventional method. Accordingly, it is possible to acquire an advantageous effect that a burden imposed on a treatment subject can be reduced.

Further, in the conventional bracket orthodontics, a bracket smaller than a tooth is mounted at a preset position at a preset angle and hence, a high technique is required in positioning. However, in the present invention, the positioning of the bracket is completed by placing the correction wire through pipe on the occlusal surface of the molar, and the bracket is prepared by thickly depositing a dental resin from above the correction wire through pipe. Accordingly, it is possible to acquire an advantageous effect that the treatment can be performed easily without requiring a high technique.

Further, in the conventional bracket orthodontics where the bracket is mounted on a tongue side or a cheek side, with respect to the correction in the uplifting direction, that is, the correction for raising a tooth in a fallen state, it is difficult to decide the position of the bracket. As a result, in a case where the bracket is mounted over an accurate position, an undesired force is applied to a raised tooth in a downward direction due to a restoring force of the correction wire. On the other hand, in an opposite case where the bracket is mounted below the accurate position, an undesired force is applied to the raised tooth in an upward direction due to the restoring force of the correction wire. In both cases, upper surfaces of the teeth of the dentition are not levelled and hence, the incomplete orthodontics is performed. However, in the present invention, the bracket is mounted on the upper surface of the occlusal surface of the molar, that is, on the upper surface of the tooth and hence, in performing the correction in the uplifting direction, a force is transmitted such that the upper surfaces of the teeth are naturally levelled due to a restoring force of the correction wire. Accordingly, it is possible to acquire an advantageous effect that the correct correction is performed.

Further, with respect to the correction in the rotational direction, that is, the correction to change the direction of the tooth surface in the conventional bracket orthodontics where the mounting of the bracket is performed on a tongue side or on a cheek side, the bracket cannot be mounted on a surface of a tooth to be corrected that abuts against a neighboring tooth, that is, on the surface that cannot be usually visually recognized. Accordingly, the rotational movement that can be performed at a time is limited and hence, in a case where the rotational movement is insufficient, it is necessary to change the position of the bracket again after the first-time correction is performed and, thereafter, to perform the second correction. However, according to the present invention, the bracket is mounted on the occlusal surface of the molar of the treatment subject and hence, the bracket position at which the rotational movement is transmitted is not limited. Accordingly, it is possible to acquire an advantageous effect that the correction to rotate the tooth can be completed by performing such rotation only once.

Further, the orthodontic bracket is formed on the occlusal surface of the dentition of the treatment subject and hence, it is possible to obstruct the strong chewing of the treatment subject during an orthodontics period, and to relax muscles and gingiva around the jaw. Accordingly, it is possible to acquire an advantageous effect that the tooth to be corrected can be easily moved.

DETAILED DESCRIPTION OF THE PREFERRED EMBODIMENTS

The present invention provides a method of preparing an orthodontic bracket used in orthodontics, and an orthodontic method performed using the orthodontic bracket. The gist of the present invention lies in that an orthodontic bracket is formed of a correction wire through pipe and an orthodontic bracket body, the correction wire through pipe is placed on a central recessed portion of a molar occlusal surface of a treatment subject, the orthodontic bracket body is formed by thickly depositing a dental resin from above the correction wire through pipe and by curing the dental resin, and a though hole through which a correction wire passes is formed by cutting front and rear end portions of the orthodontic bracket body thus exposing opening portions at both ends of the correction wire through pipe.

Figure 1:
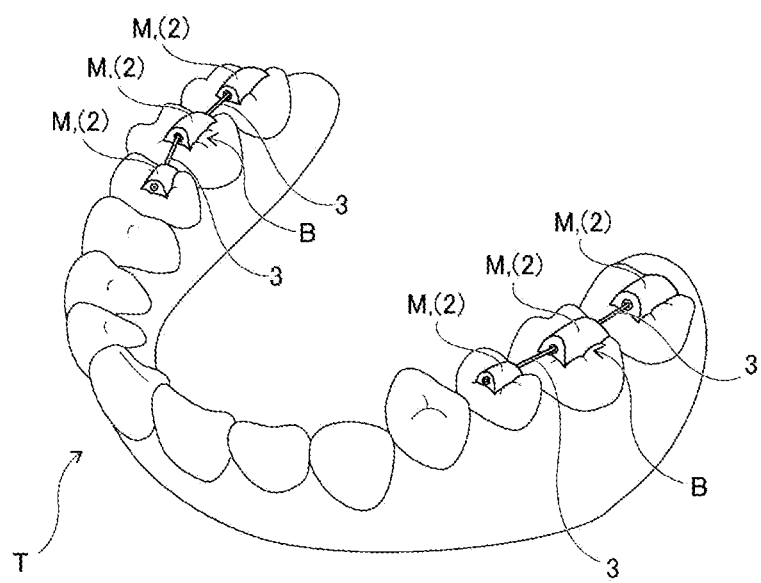
FIG. 1 is schematic perspective view illustrating a mounting state of an orthodontic bracket according to the present invention.
Figure 2:
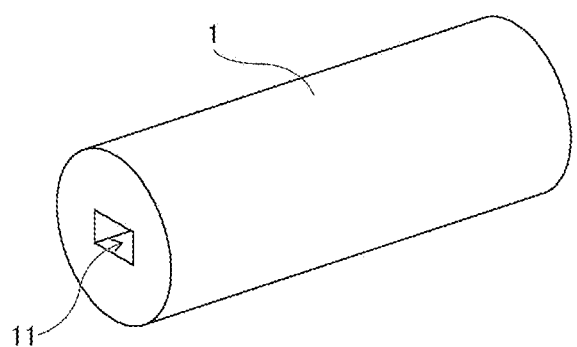
FIG. 2 is a schematic perspective view illustrating a correction wire through pipe according to the orthodontic bracket of the present invention.
Figure 3:
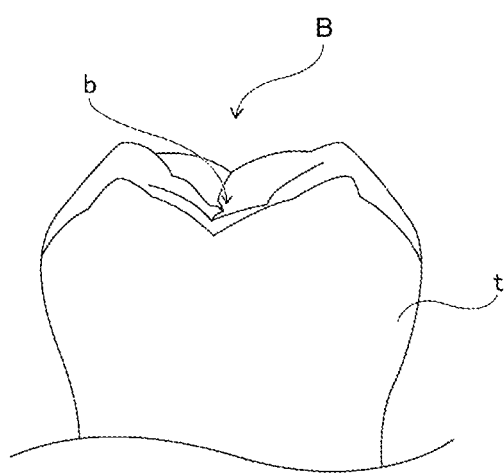
FIG. 3 is a schematic perspective view illustrating a method of preparing the orthodontic bracket of the present invention.
Figure 3:
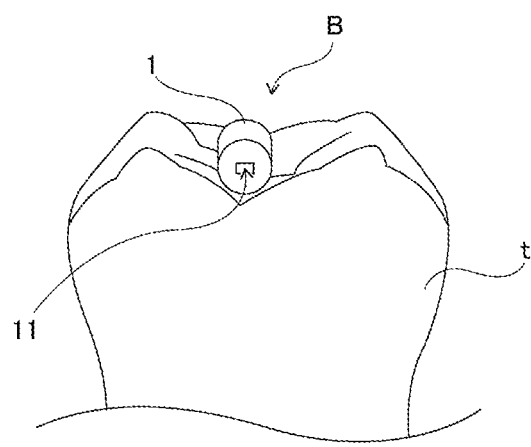
Figure 4:
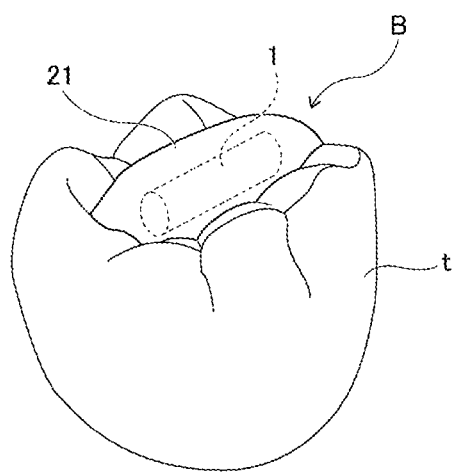
FIG. 4 is a schematic perspective view illustrating a method of preparing the orthodontic bracket of the present invention.
Figure 4:
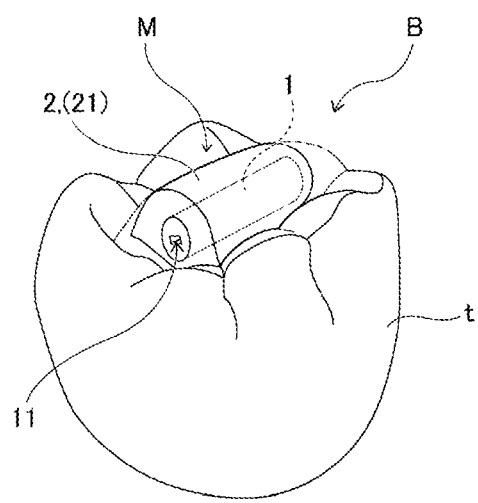
Figure 5:
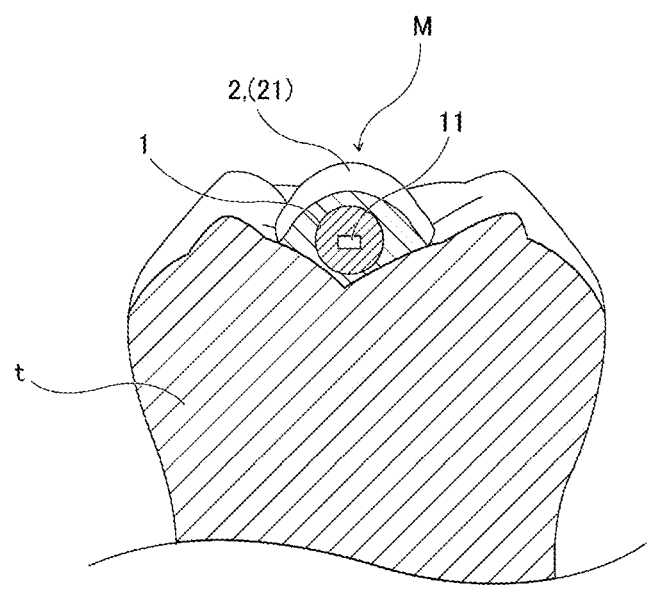
FIG. 5 is a schematic cross-sectional view illustrating the configuration of the orthodontic bracket of the present invention.
Figure 6:
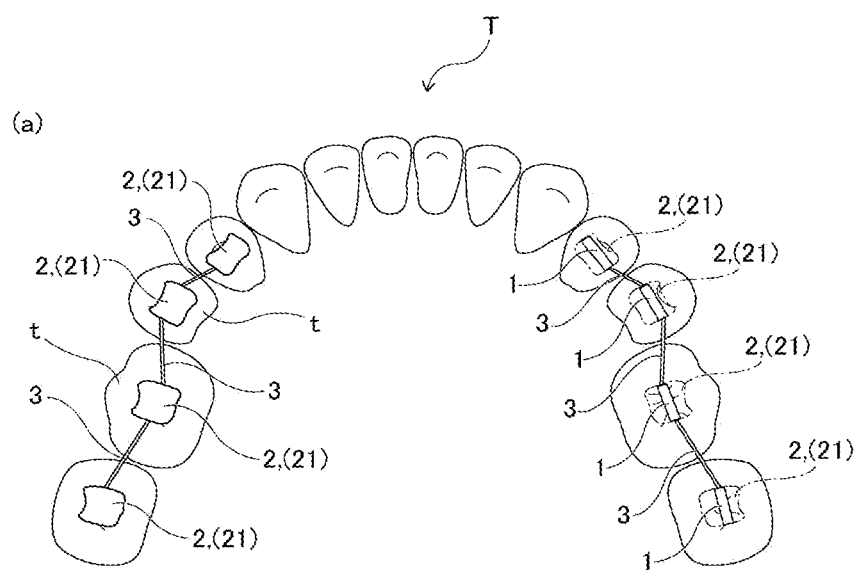
FIG. 6 is a schematic plan view illustrating a halfway state and a completion state of orthodontics using the orthodontic bracket according to the present invention.
Figure 6:
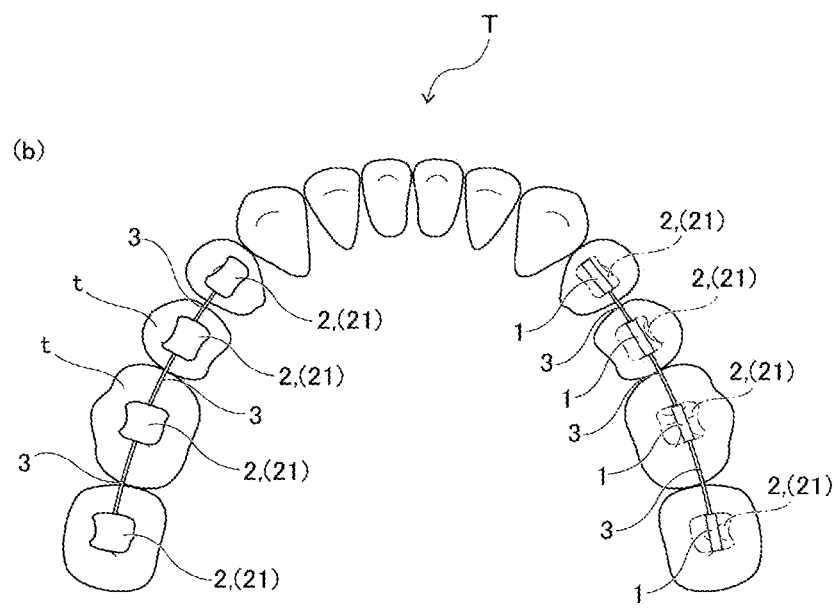

Hereinafter, an example of the method of preparing an orthodontic bracket according to the present invention is described in detail with reference to attached drawings. FIG. 1 is schematic perspective view illustrating a mounting state of an orthodontic bracket according to the present invention. FIG. 2 is a schematic perspective view illustrating a correction wire through pipe according to the orthodontic bracket of the present invention. FIG. 3 and FIG. 4 are schematic perspective views illustrating a method of preparing the orthodontic bracket of the present invention. FIG. 5 is a schematic cross-sectional view illustrating the configuration of the orthodontic bracket of the present invention. FIG. 6 is a schematic plan view illustrating a halfway state and a completion state of orthodontics using the orthodontic bracket according to the present invention.

[Configuration of Orthodontic Bracket]

An orthodontic bracket M according to the present invention is described in detail.

The orthodontic brackets M according to the present invention are, as illustrated in FIG. 1, placed on and fixed to molar occlusal surfaces B of a dentition T of a treatment subject.

The orthodontic bracket M is formed of: a correction wire through pipe 1 that is directly placed on the molar occlusal surface B; and an orthodontic bracket body 2 that is thickly deposited so as to cover the correction wire through pipe 1 from above.

As illustrated in FIG. 2, the correction wire through pipe 1 is made of a material having large corrosion resistance and large heat resistance, for example, stainless steel. The correction wire through pipe 1 is formed into a circular cylindrical shape and has a diameter of approximately 1 to 2 mm and a total length of approximately 3 to 6 mm.

Further, the shape of an opening portion formed in the circular cylindrical correction wire through pipe 1 is set to an approximately rectangular shape that is substantially equal to a shape of a cross section of a correction wire 3 described later. This hole of the correction wire through pipe 1 functions as a through hole 11 through which the correction wire 3 passes.

The molar occlusal surface B on which the correction wire through pipe 1 is placed has a recessed portion b at the center of a tooth single body.

Accordingly, in placing the correction wire through pipe 1, as illustrated in FIG. 3b, simultaneously with the placement of the correction wire through pipe 1 on the molar occlusal surface B, the correction wire through pipe 1 rolls onto a recessed portion b that forms a bottom surface of a concavo-convex shape so that the correction wire through pipe 1 is naturally or automatically positioned.

Further, in placing the correction wire through pipe 1 on the recessed portion b of the molar occlusal surface B, it may be also considered to fill in advance the recessed portion b with Vaseline or the like so as to prevent the through hole 11 from being clogged by a dental resin 21 that covers the correction wire through pipe 1 from above in the next step.

As illustrated in FIG. 4, the orthodontic bracket body 2 is formed by thickly depositing the dental resin 21 from above the correction wire through pipe 1 placed on the recessed portion b of the molar occlusal surface B.

The dental resin 21 is used as a fitting that closes a hole formed in a tooth surface at the time of performing treatment of a decayed tooth or the like. The dental resin 21 is a material having photocuring property, for example, an ultraviolet curing resin.

In the actual preparation of orthodontic bracket body 2, as illustrated in FIG. 4a, first, the dental resin 21 is thickly deposited on the correction wire through pipe 1 placed on the molar occlusal surface B such that the dental resin 21 covers the correction wire through pipe 1 from above.

Next, the dental resin 21 is cured by irradiating an ultraviolet ray to the dental resin 21 using a UV light or the like.

Then, as illustrated in FIG. 4b, the dental resin 21 is cut such that both end portions of the correction wire through pipe 1 embedded in the cured dental resin 21, that is, through holes 3 for allowing the correction wire 3 to pass through are exposed.

With such operations, the orthodontic bracket M is formed in FIG. 4b and FIG. 5 such that the dental resin 21 embraces the correction wire through pipe 1.

Further, in thickly forming the dental resin 21 on the molar occlusal surface B, by applying a dental adhesive material to the molar occlusal surface B by coating in advance, the formed orthodontic bracket body 2 can be fixedly mounted on the molar occlusal surface B of the treatment subject more firmly.

In performing the correction, as illustrated in FIG. 6, the correction wire 3 is sequentially made to pass through the through hole 11 formed in the correction wire through pipe 1 in the orthodontic bracket M formed by the above-mentioned method.

As the correction wire 3 that is made to pass through the through hole 11 at this stage of the operation, a wire that is made of metal having elasticity, for example, stainless steel, and is bent in an arcuate shape in advance estimating an ideal dentition state is used.

As illustrated in FIG. 6a, the correction wire 3 that is made to pass through the correction wire through pipe 1 cannot keep an original arcuate shape and is bent by a strain.

Then, the correction wire 3 moves and corrects the dentition T by a restoring force that intends to return the correction wire 3 to an original arcuate shape. Eventually, the correction of the dentition T is completed as illustrated in FIG. 6B.

In the actual correction of the dentition T, the correction cannot be completed by the single correction wire 3. For example, plural kinds of correction wires 3 having small diameters respectively may be prepared, and the correction of the dentition T may be performed in stages using the correction wires 3 in order from the correction wire 3 having the smallest diameter.

Further, in performing the correction of the dentition T in stages, it is unnecessary to form the correction wires 3 such that all correction wire 3 have the same arcuate shape from the beginning, and may be formed by suitably bending each correction wire 3 at the time of performing the diagnosis of the dentition T.

The correction wire 3 may be substantially equal to a correction wire used in a conventional bracket orthodontics. For example, although it is preferable that the correction wire 3 have an approximately rectangular cross-sectional shape so as to prevent the rotation of the correction wire 3 in the through hole 11, the correction wire 3 is not limited to such a cross-sectional shape, and may have a circular shape or the like. In this case, the shape of the through hole 11 through which the correction wire 3 passes may be suitably changed in conformity with the shape of the correction wire 3.

(Correcting Steps Using Orthodontic Bracket)

Next, the correcting steps using the orthodontic bracket M according to the present invention are described in detail.

Figure 7:
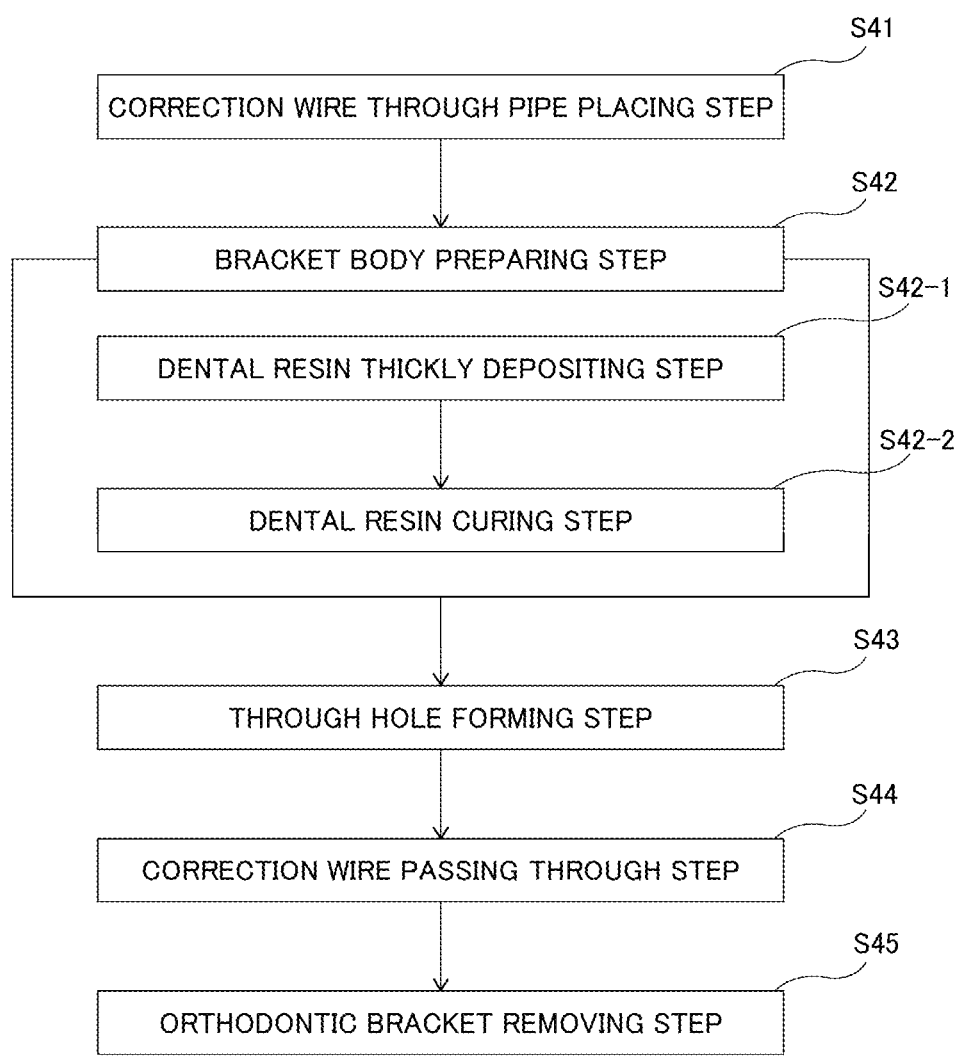
FIG. 7 is a flowchart illustrating correction steps using the orthodontic bracket according to the present invention.

FIG. 7 is a flowchart illustrating the correcting steps using the orthodontic bracket M according to the present invention.

As described in FIG. 7, the correcting steps using the orthodontic bracket M includes: a correction wire through pipe placing step S41 where the correction wire through pipe is placed on the molar occlusal surface having a tooth t to be corrected; a bracket body preparing step S42 where the bracket body is formed by thickly depositing a dental resin on the occlusal surface; a through hole forming step S43 where the through hole through which the correction wire passes is formed by cutting the front and rear end portions of the bracket body; a correction wire passing through step S44 where the correction wire is made to pass through the through hole; and an orthodontic bracket removing step S5 where the correction wire and the orthodontic bracket are removed after orthodontics are completed.

The correction wire through pipe placing step S41 is, as described above with reference to the configuration of the orthodontic bracket M, a step where the correction wire through pipe 1 is placed on the molar occlusal surface B that includes the tooth t to be corrected.

The correction wire through pipe 1 has a circular cylindrical shape and hence, even in a case where the position at which the correction wire through pipe 1 is placed differs, the correction wire through pipe 1 rolls on the molar occlusal surface, and rolls to the deepest recessed portion b of a concavo-convex shape that is positioned at the central portion of the molar occlusal surface B.

That is, by placing the correction wire through pipe 1 on the upper portion of the molar occlusal surface B, the correction wire through pipe 1 naturally or automatically rolls on and is placed at the accurate position.

The bracket body preparing step S42 is formed of a dental resin thickly depositing step S42-1, and a dental resin curing step S42-2.

The dental resin thickly depositing step S42-1 is a step where the dental resin 21 is thickly deposited on the molar occlusal surface B so as to form the shape of the bracket body 2.

To be more specific, the dental resin 21 is thickly deposited such that the dental resin 21 covers the correction wire through pipe 1 placed on the most recessed portion b of the molar occlusal surface B in the correction wire through pipe placing step S41.

At this stage of the operation, in a case where it is desirable to increase an orthodontic effect by interrupting chewing at the time of performing the orthodontics described above, the dental resin 21 may be thickly deposited such that the dental resin 21 protrudes higher than a convex portion of the molar occlusal surface B.

The dental resin curing step S42-2 is a step where the dental resin 21 that is thickly deposited on the molar occlusal surface B in the dental resin thickly depositing step S42-1 is cured.

The dental resin 21 is a photocuring material, and is a composite resin or the like that is used in the decayed tooth treatment, for example.

By irradiating an ultraviolet ray to the dental resin 21, the dental resin 21 is cured so that the bracket body 2 can be prepared.

The through hole forming step S43 is a step where undesired portions of the bracket body 2 prepared by irradiating an ultraviolet ray to the dental resin 21 in the dental resin curing step S42-2 are cut away so as to form the orthodontic bracket M.

The dental resin 21 that is thickly deposited in the dental resin thickly depositing step S42-1 is cured in the dental resin curing step S42-2 in a state where the dental resin 21 covers the correction wire through pipe 1.

Accordingly, a hole formed in the correction wire through pipe 1 is in a state where the hole is embedded in the bracket body 2.

In view of the above, to expose the hole formed in the correction wire through pipe 1, the undesired portions of the cured dental resin 21 are cut away and are removed.

The hole of the correction wire through pipe 1 that is exposed in this step forms the through hole 11 that allows the correction wire 3 to pass therethrough in the next step.

Further, extra uneven resin portions that are formed at the time of thickly depositing the dental resin 21 or resin portions that adhere to other teeth at the time of thickly depositing the dental resin 21 are removed simultaneously with such an operation of cutting away and removing the undesired portions.

Further, by performing this through hole forming step S43, the preparation of the orthodontic bracket M is completed.

At the stage of preparing the orthodontic brackets M, the orthodontic brackets M conform to the directions and the angles of the teeth before orthodontics and hence, the through holes 11 are directed in various directions.

The correction wire passing through step S44 is the step of making the correction wire 3 pass through the orthodontic brackets M respectively prepared through the correction wire placing step S41 to the through hole forming step S43.

The correction wire 3 that is made to pass through is made of an elastic material, and is bent in an arcuate shape formed by estimating the dentition in an ideal state.

The correction wire 3 that is bent in an arcuate shape is made to sequentially pass through the through holes 11 formed in the orthodontic brackets M so that the correction wire 3 is bent in various directions along which the through holes 11 are directed by strains.

The correction wire 3 that is bent in various directions by strains is made of an elastic material and hence, a restoring force acts so as to allow the correction wire 3 to return to an original arcuate shape that is formed estimating an ideal state.

The restoring force is transmitted to the tooth by way of the orthodontic bracket M so that the tooth is moved and is corrected.

Further, as has been described with respect to the configuration of the orthodontic bracket M, the passing through of the correction wire 3 may be performed in plural stages by changing a diameter of each correction wire 3.

The orthodontic bracket removing step S45 is a step where the completion of the orthodontics is determined based on returning of the correction wire 3 to an original arcuate shape due to a restoring force, and the correction wire 3 and the orthodontic bracket M are removed from the dentition T of the treatment subject.

With this step, the orthodontics using the orthodontic bracket M according to the present invention is completed.

As has been described above, the orthodontic bracket M according to the present invention can start the partial correction of a molar within a shortest period.

Further, in a case where the symptom is the slight malocclusion, the orthodontics can be completed only by an orthodontic method using the orthodontic bracket M according to the present invention. However, it is not always necessary to complete the orthodontics only by an orthodontic method using the orthodontic bracket M according to the present invention.

That is, in a case where the orthodontic treatment requires a long period, the orthodontics using the orthodontic bracket M according to the present invention can be used in combination with other orthodontics, and can be used as an auxiliary orthodontics until the completion of the orthodontics.

For example, in orthodontics using a mouthpiece, with respect to the correction of the molar, there may be a case where the movement of the tooth to be corrected that is accompanied with the extrusion and the intrusion performed for leveling the heights of upper surfaces of teeth, the uplifting performed for raising a tooth in an inclined or fallen state, or the rotation performed for changing the directions of the teeth is difficult or impossible.

Usually, in such a case, the wire orthodontics or a surgical operation is performed before or after performing the mouthpiece orthodontics.

However, to perform the wire orthodontics additionally, it is necessary to perform a diagnosis of the treatment subject again and hence, the orthodontics starts from a point of time of deciding the course of treatment. Accordingly, such orthodontics is not considered as an efficient method.

In view of the above, by applying the orthodontics that uses the orthodontic bracket M of the present invention to a molar portion where the correction is difficult in advance before performing the mouthpiece orthodontics, the correction of the dentition T can be performed smoothly.

Further, the above-mentioned respective advantageous effects are enumerated in an exemplifying purpose as most preferable advantageous effects, and the advantageous effects of the present invention are not limited to such advantageous effects.

REFERENCE SIGNS LIST

M: orthodontic bracket
T: dentition of treatment subject
t: tooth to be corrected
B: molar occlusal surface
b: recessed portion
1: correction wire through pipe
11: through hole 2: orthodontic bracket body
21: dental resin
3: correction wire
S41: correction wire through pipe placing step
S42: bracket body preparing step
S42-1: dental resin thickly depositing step
S42-2: dental resin curing step
S43: through hole forming step
S44: correction wire passing through step
S45: orthodontic bracket removing step

What is claimed is:

1. A method of preparing an orthodontic bracket and a method of performing orthodontics using the orthodontic bracket, wherein the orthodontic bracket that performs orthodontics is formed of a correction wire through pipe and an orthodontic bracket body, the correction wire through pipe is placed on a central recessed portion of a molar occlusal surface of a treatment subject, the orthodontic bracket body is formed by thickly depositing a dental resin from above the correction wire through pipe and by curing the dental resin, and a though hole through which a correction wire passes is formed by cutting front and rear end portions of the orthodontic bracket body thus exposing opening portions at both ends of the correction wire through pipe.

* * * * *